US 12,423,410 B2

(12) United States Patent
Knezevic

(10) Patent No.: US 12,423,410 B2
(45) Date of Patent: Sep. 23, 2025

(54) DATA PROCESSING SYSTEM WITH SECURE MEMORY SHARING

(71) Applicant: NXP USA, Inc., Austin, TX (US)

(72) Inventor: Miroslav Knezevic, Bee Cave, TX (US)

(73) Assignee: NXP USA, Inc., Austin, TX (US)

( * ) Notice: Subject to any disclaimer, the term of this patent is extended or adjusted under 35 U.S.C. 154(b) by 162 days.

(21) Appl. No.: 18/510,894

(22) Filed: Nov. 16, 2023

(65) Prior Publication Data

US 2025/0165584 A1    May 22, 2025

(51) Int. Cl.
G06F 21/53    (2013.01)

(52) U.S. Cl.
CPC ........ G06F 21/53 (2013.01); *G06F 2221/033* (2013.01)

(58) Field of Classification Search
CPC .... G06F 21/53; G06F 2221/033; G06F 21/74; G06F 21/78
See application file for complete search history.

(56) References Cited

U.S. PATENT DOCUMENTS

| | | | | |
|---|---|---|---|---|
| 2013/0191651 A1* | 7/2013 | Muff | ............ | G06F 12/1027 713/193 |
| 2015/0363332 A1* | 12/2015 | Mundra | ............ | G06F 21/62 713/193 |
| 2016/0092678 A1 | 3/2016 | Probert et al. | | |
| 2018/0276392 A1 | 9/2018 | Hoogerbrugge et al. | | |
| 2019/0384923 A1 | 12/2019 | Leitao et al. | | |
| 2023/0334146 A1* | 10/2023 | Liu | ............ | G06N 3/063 |
| 2024/0028775 A1* | 1/2024 | Mundra | ............ | G06F 12/1408 |
| 2024/0176898 A1* | 5/2024 | Hale | ............ | G06F 13/4221 |
| 2024/0333473 A1* | 10/2024 | Morshed | ............ | G06F 12/0895 |

FOREIGN PATENT DOCUMENTS

EP    2759955 A1    7/2014

\* cited by examiner

*Primary Examiner* — Beemnet W Dada
(74) *Attorney, Agent, or Firm* — Joanna G. Geld

(57) ABSTRACT

A trusted execution environment (TEE) includes a first requestor, a first local interconnect, an access controller, and a first memory encryption circuit, and the access controller allows or denies access requests to a shared memory external to the TEE. A normal execution environment (NEE) communicates with the TEE via a set of address lines and a set of data lines, and includes a second requestor and a second local interconnect. The first memory encryption circuit encrypts write data corresponding to allowed access requests to the shared memory generated by only one of the first requestor and the second requestor prior to the TEE providing the write data for storage into the shared memory. Any write data corresponding to allowed access requests to the shared memory generated by another one of the first requestor and the second requestor is provided as unencrypted write data for storage into the shared memory.

19 Claims, 3 Drawing Sheets

DATA PROCESSING SYSTEM WITH SECURE MEMORY SHARING

BACKGROUND

Field

This disclosure relates generally to data processing systems, and more specifically, to secure memory sharing within data processing systems.

Related Art

As data processing systems become increasingly complex, it becomes increasingly challenging to implement robust security protections, especially when limited by constraints such as, for example, power consumption and die size. To provide strong protection, some currently available data processing systems include a secure subsystem or secure enclave which performs security operations for the data processing system. Typically such secure subsystems include internal secure memories for performing the required security operations. With increasing complexity and quantity of security operations, though, the memory sizes required for such internal secure memories also increase, thus increasing the overall die size, such as in the case of a system-on-chip (SoC). However, increases in die size negatively impacts power consumption and cost of the SoC.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, the size of a data processing system having a secure subsystem (implementing a trusted execution environment (TEE)) is reduced by allowing memory to be shared between the secure subsystem and other subsystems of a data processing system (implementing non-trusted normal execution environments (NEE)). Since memories are an expensive resource, sharing memories may allow for reduced cost and size. However, when memory is shared, the risk of confidential data leakage or of one execution environment corrupting the integrity of another execution environment significantly increases. Therefore, a hardware-enforced method using memory encryption is implemented to control access to the shared memory in which such hardware-enforced method cannot be manipulated by potentially untrusted software. In one embodiment, a shared memory can be accessed via at least two distinct physical data paths, one for each execution environment that is supposed to have access to the shared memory. One of the execution environments is a TEE which regulates memory accesses to the shared memory. To protect the shared memory, a memory encryption engine is implemented in each of the distinct physical data paths except for the one coming from the TEE. Alternatively, a memory encryption engine is implemented only for the data path coming from the TEE but not in the data paths from the NEEs. In this manner, the memory content of the shared memory will remain protected from any execution environment (any NEE) that is not supposed to have access to the shared memory.

Figure 1:
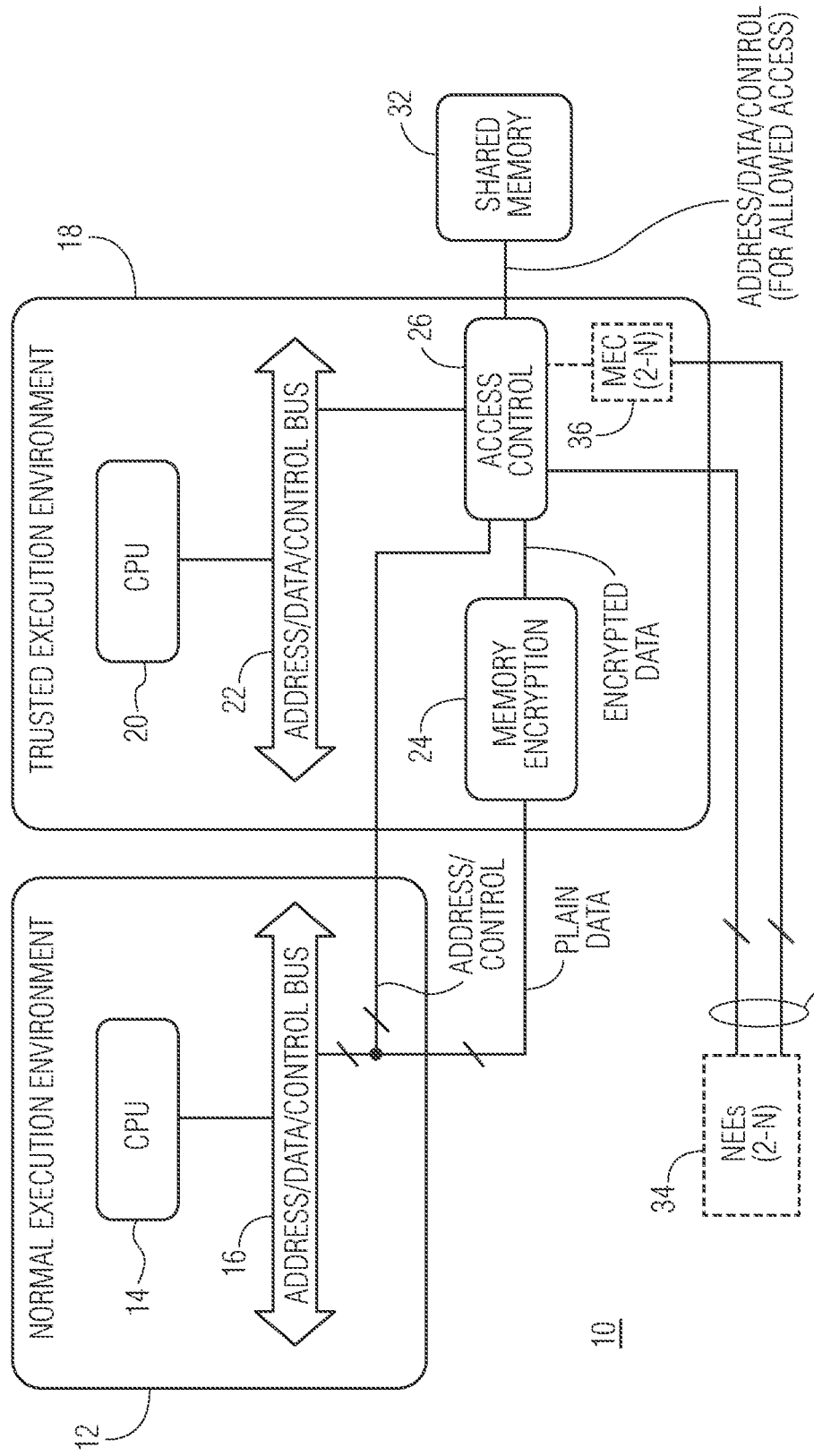
FIGS. 1-3 illustrate various data processing systems, each having a normal execution environment, a trusted execution environment, and a shared memory, in accordance with embodiments of the present invention.

FIG. 1 illustrates a data processing system 10 having an NEE 12, a TEE 18, and a shared memory 32, in accordance with an embodiment of the present invention. Data processing system 10 may be implemented as an SoC, and may therefore be referred to as SoC 10. SoC 10 may also include additional NEEs (2-N) 34 for a total of N NEEs in which N can be any integer greater than or equal to 2. In the illustrated embodiment, NEE 12 includes a central processing unit (CPU) 14 and a local bus 16 which may communicate address, data, and control information. NEE may include any number of elements in addition to CPU 14 and local bus 16, such as, for example, additional cores or CPUs, peripherals, input/output (I/O) ports, memories, etc., in which each additional element may be bidirectionally coupled to local bus 16, or may be coupled directly to CPU 14 (or other core or element of the NEE) via sideband signals outside of bus 16, or both. (Note that the descriptions for NEE 12 also apply to any NEE of NEEs 34 as well, in which each NEE can include any combination of cores, CPUs or other elements.) In the illustrated embodiment, TEE 18 includes a CPU 20, a local bus 22, an access controller 26 (also referred to as access control circuit), and a memory encryption circuit 24. Similar to NEE 12, TEE 18 may also include any number of additional elements, such as, for example, additional cores or CPUs, peripherals, input/output (I/O) ports, memories, etc., in which each additional element may be bidirectionally coupled to local bus 22, or may be coupled directly to CPU 20 (or other core or element of the TEE) via sideband signals outside of bus 16, or both. In the case that SoC 10 includes additional NEEs 34, TEE 18 may also include additional memory encryption circuits (2-N) 36 (referred to as MECs 36). In alternate embodiments, note that each of bus 16 and 22 may be referred to as interconnects or local interconnects and can be implemented with any type of interconnect as known in the art, such as a cross-bar switch or interconnect fabric.

In the illustrated embodiment, TEE 18 is mutually exclusive with NEE 12 (and with any of NEEs 34). NEE 12 is coupled to communicate with TEE 18 via address and control lines coupled to access controller 26 and data lines coupled to memory encryption circuit 24. Within TEE 20, memory encryption circuit 24 is configured to encrypt/decrypt data with a key generated by CPU 20. CPU 20 (e.g. software executing on CPU 20) configures and controls access controller 26. Access controller 26 is configured to control or gate access to shared memory 32. Only those access requests which are allowed or granted by access controller 26 are provided to shared memory 32. Access controller 26 receives access requests from NEE 12 (e.g. from CPU 14 via bus 16) as well as from within TEE 18 (e.g. from CPU 20 via bus 22), in which each access request includes a corresponding access address and corresponding control information. For example, the corresponding control information may indicate a type of access (e.g. a read or write access) and may provide a secure identifier (ID) which identifies the requestor (i.e. the element which originated the access request). Note that if an access request is a write access request, the access request further includes corresponding write data.

Any element or device in SoC 10 which is capable of generating access requests to shared memory 32 may be referred to as a requestor (i.e. master). In one embodiment, each element or device within SoC 10 has an assigned secure ID to uniquely identify the element or device. This secure ID can be included as part of any access request routed within SoC 10 in order to identify the source of the access request. Therefore, access requests from NEE 12 or from TEE 18 can be made by any requestor (e.g. master or initiator device) within the corresponding environments. In the illustrated example, CPU 14 is a requestor of NEE 12 and CPU 20 is a requestor of TEE 18.

TEE 18 operates a secure subsystem or secure enclave of SoC 10 which performs the security-related functions of SoC 10. For example, TEE 18 may implement a secure boot for SoC 10, control access to SoC 10 (such as at debug ports and test ports), perform secure functions such as encryption/decryption for SoC 10, and control access to shared memory 32. The remainder of SoC 10, outside of TEE 18, may include any number (i.e. one or more) of NEEs, in which each of the NEEs can be coupled to communicate with TEE 18 via address and control lines coupled to access controller 26 and data lines coupled to a corresponding memory encryption circuit of TEE 18. Therefore, SoC 10 may include NEE 12 and no additional NEEs, or SoC 10 may also include additional NEEs 34. As a secure enclave, access to circuitry or storage within TEE 18 is tightly restricted, in which invasive physical security breaches or breach attempts by malicious users or attackers tend to occur at inputs to and outputs from TEE 18 or by corrupting stored bits or disturbing power supplies (e.g. injecting voltage glitches at power supply terminals) of TEE 18.

In the illustrated embodiment, TEE 18 is configured to use shared memory 32 for performing security-related functions. Therefore, TEE 18 may not include any local memory with TEE 18 (or may include only small amount of local memory). However, TEE 18 may include other storage elements such as secure registers and buffers, as needed. While requests to use shared memory 32 can come from any NEE, only TEE 18 (and none of the NEEs) controls access to shared memory 32. TEE 18 controls access by configuring access controller 26 to either allow or deny access requests by other NEEs to shared memory 32. For example, TEE 18 may only allow another NEE to access shared memory 32 when it is not using the shared memory. Further, as will be discussed below, since TEE 18 controls if and when another NEE can access shared memory 32, TEE 18 can also take precautions such as clearing or overwriting sensitive data from the shared memory prior to transferring access rights to a NEE. As will be discussed further below, the use of a shared memory, located outside of TEE 18, needs to be protected to prevent access to any sensitive data either temporarily or permanently stored within shared memory 32 (in which shared memory 32 can be implemented as either volatile or non-volatile memory).

In operation, access controller 26 is configured by CPU 20 to control access to shared memory 32. In one embodiment, access controller 26 may be implemented as a hardware block which is controlled by software executing on CPU 20. For example, access controller 26 may store configuration information in registers, such as secure IDs and corresponding address ranges, which are allowed to access shared memory 32. Therefore, in response to comparing the address and control information of a received access request to the stored configuration information, access controller 26 can either grant or deny access to shared memory 32. (Note that other hardware implementations configurable by CPU 20 or other elements of TEE 18 may be used to implement access controller 26.) If access is granted, access controller 26 provides any required address and control information to shared memory 32. If the granted access is a write access, access controller 26 also provides corresponding write data to shared memory 32 (or allows the corresponding write data to be provided to shared memory 32). If the granted access is a read access, then access controller 26 receives read data from shared memory 32. However, depending on which environment is granted access to shared memory 32, the write data or read data corresponding to the granted access request may or may not be encrypted or decrypted, respectively, by memory encryption circuitry.

In the illustrated embodiment, TEE 18 includes memory encryption circuit 24 in the data path from NEE 12 to access control 26. Memory encryption unit 24 is coupled to receive plain data via bus 16 from CPU 14 (or from another requestor of NEE 12), encrypt the plain data, and output the encrypted data. Memory encryption 24 may also receive encrypted data from shared memory 32 via access controller 26, decrypt the encrypted data, and return plain data back to NEE 12. The key used by memory encryption circuit 24 for encryption/decryption is generated and stored within TEE 18. For each request from NEE 12 (whether a read or write request), the corresponding address and control information is provided to access controller 26 which determines whether or not to grant the access, as explained above.

For write access requests, NEE 12 also provides corresponding write data as plain data to memory encryption 24. If access controller 26 grants the write access request, then any required portions of the corresponding access address and control information, along with the memory write data, is provided to shared memory 32, in which the encrypted data from memory encryption 24 is provided as the memory write data to be written at the corresponding access address (i.e. write address) of shared memory 32. For granted read access requests, any required portions of the corresponding access address and control information is provided to shared memory 32, and in response, read data stored at the corresponding access address (i.e. read address) is received from shared memory 32. This read data is provided to memory encryption circuit 24 which decrypts the read data and returns the decrypted read data as plain data back to NEE 12 (back to the requestor of NEE 12).

Allowed access requests from CPU 20 (or other requestor of TEE 18) is similarly provided to shared memory 32, except that no encryption/decryption is performed on the write data or read data. That is, memory encryption circuit 24 only encrypts/decrypts data from or to NEE 12, and not for TEE 18. Further, in the illustrated embodiment, memory encryption 24 does not encrypt/decrypt data from or to any other NEE either. Since TEE 18 does not include a memory encryption circuit in its data path between the requestor (e.g. CPU 20) and access controller 26, any write data from TEE 18 to shared memory 32 is provided as unencrypted plain data, and any read data from shared memory 32 back to TEE 18 is likewise provided as unencrypted plain data to the requesting master. Therefore, in response to granted read and write access requests from TEE 18 to shared memory 32, only unencrypted plain data is transferred between CPU 20 (or any other requestor of TEE 18) and shared memory 32.

Note that shared memory 32 may operate as known in the art to perform the read or write operations received from access controller 26. Also, note that any of the write data for shared memory 32, whether plain or encrypted, can be stored in write buffers of TEE 18, as needed, prior to being sent to shared memory 32, and any returned read data from shared memory 32 can also be stored in read buffers of TEE 18, as needed. In one embodiment, write data for allowed write access requests is provided via access controller 26 to shared memory 32. Alternatively, access controller 26 can instead indicate to the write buffer to provide the write data to shared memory 32. Therefore, the routing of write and read data for allowed access requests can be managed in different ways.

In one example of transferring ownership (i.e. control) of shared memory 32, while TEE 18 is granted access to shared memory 32 by access controller 26 (as configured by TEE 18), TEE 18 receives an access request to shared memory 32 from NEE 12. In response to this received access request, TEE 18 may first ensure that the request is authentic (e.g. that the request actually originated from NEE 12, which may be done through a dedicated hardware signal or through a cryptographically signed message). Assuming that the access request is authentic, TEE 18 ensures that shared memory 32 is not needed for any of its internal security operations. Once shared memory 32 is free or no longer needed by TEE 18, TEE 18 may clean the memory content of shared memory 32. For example, CPU 20 may clear the content by overwriting the content of the memory with randomly generated data to protect any sensitive data which may have been written to shared memory 32 by TEE 18. After the memory content has been cleaned, TEE 18 reconfigures access controller 26 to grant NEE 12 access to shared memory 32.

Once NEE 12 completes its operation requiring use of shared memory 32, NEE 12 can inform TEE 18 (e.g. inform CPU 20) that control of shared memory 32 can be taken back by TEE 18. At this point, TEE 18 reconfigures access controller 26 to allow TEE 18 to access shared memory 32 and to prevent NEE 12 (and any other NEE) from accessing shared memory 32. In one embodiment, TEE 18 again cleans the content of shared memory 32, and afterwards, resumes operating using shared memory 32 as needed for its operations.

In one example of an attack scenario, while ownership of shared memory 32 is being transferred between TEE 18 and NEE 12, a physical fault attack may occur (e.g. by corrupting gates or bits, injecting voltage glitches, corrupting logic states, etc.) which may result in manipulating the integrity of the decision making by access controller 26. For example, while TEE 18 has ownership of the shared memory, access controller 26 can be manipulated to maliciously grant access to NEE 12. In this case, an attacker running inside of NEE 12 may get unauthorized access to the confidential information stored in shared memory 32. However, with the addition of memory encryption 24 between NEE 12 and shared memory 32, if NEE 12 accesses any data within shared memory 32 stored by TEE 18 during its ownership of the shared memory, NEE 12 will only be able to receive useless (e.g. destroyed) data. That is, because data from TEE 18 is written into shared memory 32 as plain unencrypted data but any read data accessed by NEE 12 from shared memory 32 is decrypted by memory encryption 24 before being returned to NEE 12, the read data actually returned to NEE 12 is incorrectly decrypted thus effectively destroying the accessed sensitive information.

In another example of an attack scenario, while NEE 12 has ownership of shared memory 32, an attacker may attempt to load malicious code into shared memory 32 and inject a fault attack in an attempt to skip the memory cleaning process by TEE 18. This could therefore result in TEE 18 executing malicious code which provides access to sensitive processes and information. However, with the addition of memory encryption circuit 24, the content (e.g. the malicious code) that is to be written into shared memory 32 is first encrypted. Since CPU 20 of TEE 18 accesses read data from shared memory 32 as plain data (without any encryption/decryption), the encrypted malicious code would not be decrypted and thus effectively be garbage to CPU 20. In this manner, an attacker could not control the content that eventually ends up being written into shared memory 32 because it will always be first encrypted by memory encryption 24 before being stored into shared memory 32.

Figure 2:
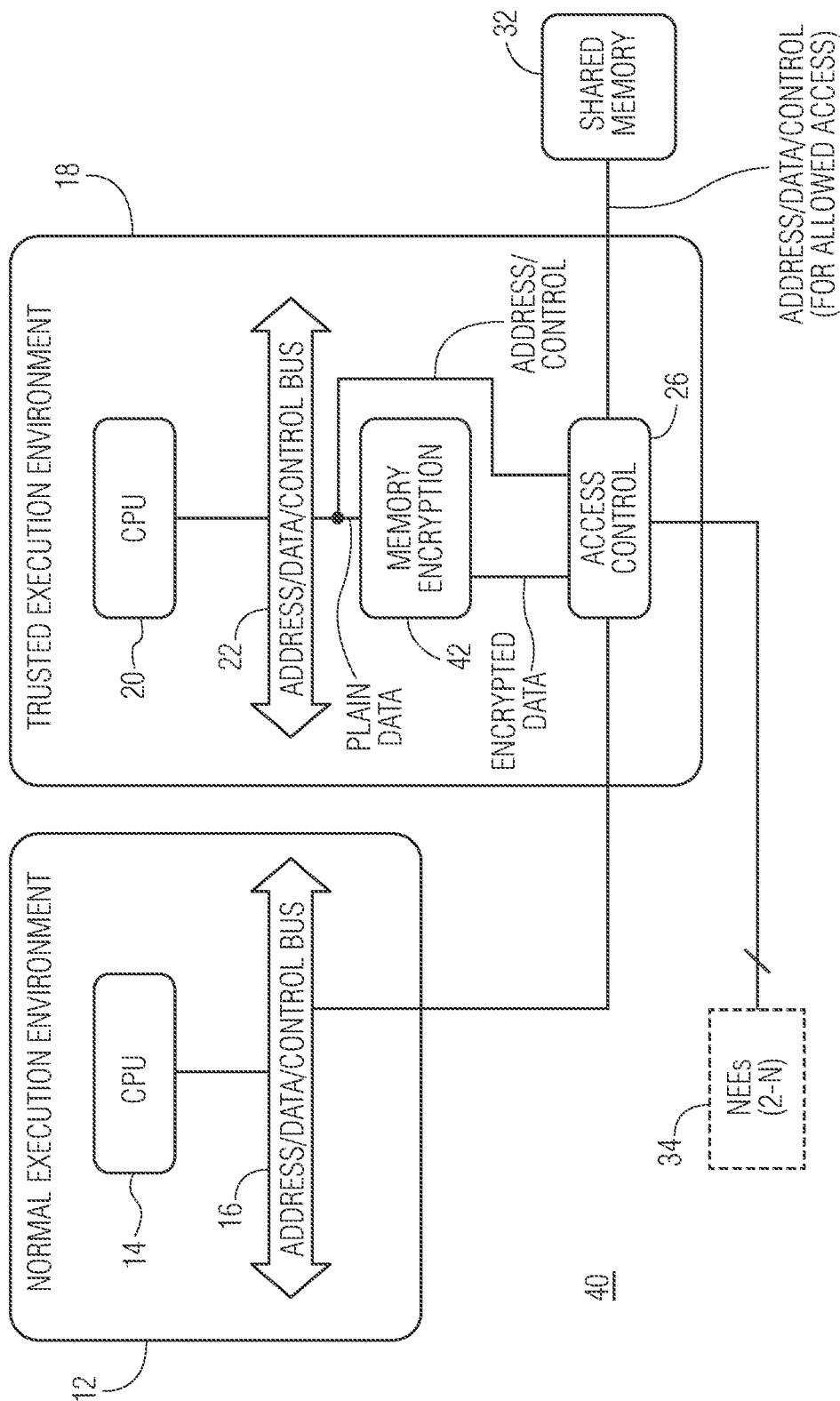

FIG. 2 illustrates an SoC 40 which is similar to SoC 10, in accordance within one embodiment of the present invention, but with a different configuration for the memory encryption circuits within the TEE, in which like numbers between SoC 10 and SoC 20 indicate like elements. Therefore, in SoC 40, memory encryption circuit 24 is not present in the data path between NEE 12 and access control 26, such that plain (unencrypted) data is written to shared memory 32 and read memory from shared memory 32 is likewise not decrypted, similar to how TEE 18 accesses shared memory 32 in SoC 10, without memory encryption. Instead, a memory encryption unit 42 is located in the data path between CPU 20 and access control 26 in which any write data for an allowed write access request from TEE 18 is first encrypted by memory encryption 42 such that the encrypted data is provided as the memory write data to shared memory 32. Likewise, any read data returned from shared memory 32 for an allowed read access request is first decrypted by memory encryption circuit 42 before being provided back to CPU 20. Similar to memory encryption 24, the key used by memory encryption circuit 42 is also generated by and stored within TEE 18. This configuration is also capable of protecting against the example attack scenarios described above because if TEE 18 has ownership, but access controller 26 is manipulated to allow NEE 12 to access to shared memory 32, only encrypted data will be accessed which cannot be decrypted by NEE 12, thus preventing access to sensitive information. Similarly, if NEE 12 has ownership and is capable of loading malicious code into shared memory 32 (which would not be encrypted), when TEE 18 loads the malicious code from shared memory 32, the malicious code will first be decrypted by memory encryption circuit 42, resulting in destroying the malicious code or making the malicious code inexecutable in TEE 18.

Therefore, in one embodiment, each environment of an SoC, including a TEE and any number of NEEs (e.g. NEE 12 and NEEs 34, if present), has a corresponding physical data path, distinct from other physical data paths, to access shared memory 32 via access controller 26. For example, NEE 12 communicates its access requests via a set of conductors between bus 16 and access control 26 and TEE 18 communicates its access request via a set of conductors between bus 22 and access controller 26. If there are other requestors (e.g. masters) in either of NEE 12 and TEE 18 which are capable of accessing shared memory 32, they would each include their own corresponding data paths to access controller 26, so that access controller 26 can properly decide which access requests are granted (and thus forwarded to shared memory 32) or denied. Similarly, if additional NEEs 34 are also present, each of NEEs 34 (or each requestor within these NEEs) would also include their own physical data path to access shared memory 32 via access controller 26. Therefore, access controller 26 can be coupled to receive access requests from any number of environments, including from any number of requestors within the environments (in which each requestor would have its own assigned unique secure ID). TEE 18 can therefore configure access controller 26 to transfer ownership to any other environment, as needed.

In an implementation of an SoC with multiple NEEs, TEE 18 would include an instantiation of a memory encryption circuit (MEC) for each physical data path into access controller 26, in which each instantiation would use a different key (generated by and stored within TEE 18). For example, similar to memory encryption circuit 24 corresponding to NEE 12, TEE 18 would include additional (2–N) MECs 36 corresponding to the (2–N) NEEs, one MEC for each physical data path between a corresponding NEE and access controller 36. MECs 36 would each be coupled and operated analogously to MEC 24 (with corresponding address/control lines coupled between each of NEEs 34 and access controller 26 and with corresponding data lines coupled between each of NEEs 34 and a corresponding MEC of MECs 36). In this manner, for any requestor in any NEE having a corresponding memory encryption circuit within TEE 18, plain data is communicated between the requestor and the corresponding memory encryption circuit, and, upon a request being granted by access controller 26, only encrypted data (memory write data or memory read data) for the allowed request is transferred between shared memory 32 and TEE 18. Note that any of the memory encryption circuits described herein (e.g. 24, 42, and 36) may be implemented with any known memory encryption engine.

Figure 3:
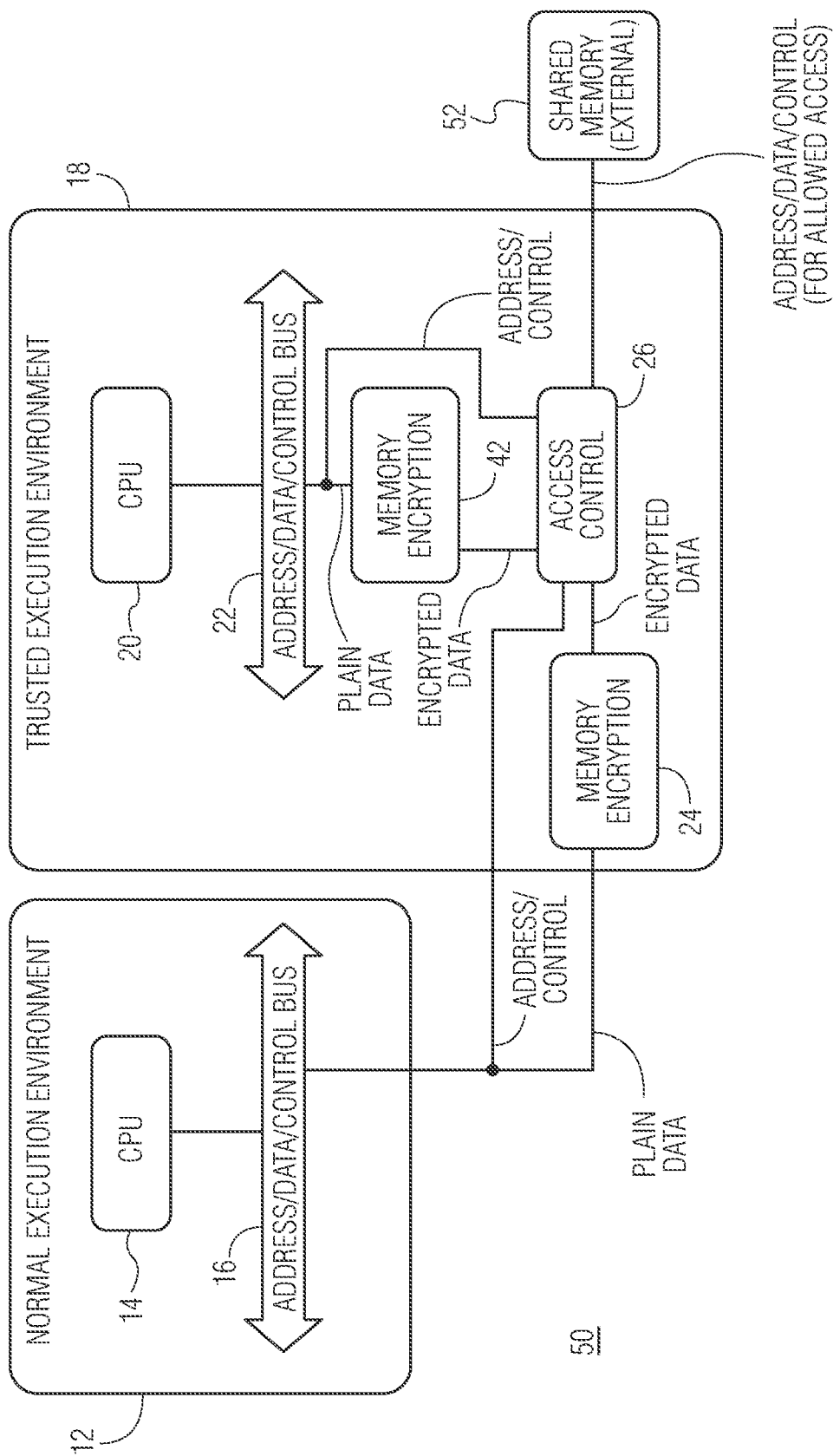

FIG. 3 illustrates an SoC 50, which is similar to SoCs 10 and 40 in accordance within one embodiment of the present invention, in which like numbers indicate like elements, but in which shared memory 52 is located external to the SoC. In this example, TEE 18 includes an instantiation of a memory encryption circuit for each physical data path between any requestor and access controller 26, each instantiation using a different key (generated by and stored in TEE 18). In this situation, security may not be as strong since the contents of an external shared memory my be accessible directly by an attacker. Therefore, encryption circuits for all data paths provides additional security for this situation. (Note that in SoC 50, additional NEEs and additional MECs may also be present, as was described above with respect to NEEs 34 and MECs 36 of FIGS. 1 and 2.)

Referring back to SoC 10 of FIG. 1, in which additional NEEs 34 are also present, alternate embodiments may implement the memory encryption differently. For example, since memory encryption engines can be expensive in terms of area and performance, rather than having one instantiation of an MEC for each NEE, a single memory encryption engine can be shared between two or more NEEs. In this example, a fault attack may impact the memory isolation of shared memory 32 between different NEEs with a shared memory encryption engine, but the isolation between the NEEs and TEE 18 remains intact such that any sensitive content stored by TEE 18 would not be vulnerable to such attacks.

Referring back to SoC 40 of FIG. 2, in which additional NEEs 34 are also present, one or more additional MECs may be included within TEE 18, in addition to memory encryption circuit 42, in which some or all of the NEEs of SOC 40 has their own corresponding MEC in TEE 18. For example, only a subset (i.e. less than all) of the NEEs may each have a corresponding MEC in TEE 18. Alternatively, any of the one or more additional MECs can be shared between multiple NEEs.

Therefore, while using memory encryption engines with different keys for different environments generally provides some protection, in an SoC with a TEE and an NEE, by having a memory encryption engine on only a single data path to the shared memory (either from the NEE or the TEE), improved protection against physical fault attacks man be achieved, as was described in the physical attack examples provided with respect to FIGS. 1 and 2 (with memory encryption only on the data path corresponding to NEE 12 but not on the one for TEE 18 or with memory encryption only on the data path corresponding to TEE 18 but not on the one for NEE 12). Alternatively, improved protection against such attacks can be provided by having memory encryption engines for data paths corresponding to NEEs, but not on the one for TEE 18. By differentiating whether or not encryption is provided in a data path for a TEE versus an NEE, improved protection of sensitive content in a shared memory may be achievable. For example, this includes having encryption in only the TEE data path but not in any of the NEE data paths or not having encryption in the TEE data path but having it in the NEE data paths (or in at least one or more of the NEE data paths).

Note that in FIGS. 1, 2, and 3, a conductor between elements may be illustrated with or without a hash line indicating multiple conductors. However, any of the illustrated conductors, regardless of having a hash line or not, may represent multiple conductors. As used herein, the term "bus" is used to refer to a plurality of signals or conductors which may be used to transfer one or more various types of information, such as data, addresses, control, or status. Also, the conductors or lines as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIGS. 1-3 and the discussions thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in one embodiment, the illustrated elements of data processing system 10 are circuitry located on a single integrated circuit or within a same device. Alternatively, system 10 may further include any number of separate integrated circuits or separate devices interconnected with each other. For example, memories, peripherals, etc., may be located on a same integrated circuit CPUs 14 and 20 or on separate integrated circuits or devices.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, any type of core may be used in place of CPUs 14 and 12. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention. Note that any of the aspects below can be used in any combination with each other and with any of the disclosed embodiments.

In one embodiment, a data processing system includes a shared memory; a trusted execution environment (TEE) including a first requestor, a first local interconnect, an access controller, and a first memory encryption circuit, the first requestor and the access controller coupled to the first local interconnect, and the access controller configured to allow or deny access requests to the shared memory, wherein the shared memory is external to the TEE; and a normal execution environment (NEE) configured to communicate with the TEE via a set of address lines and a set of data lines, the NEE including a second requestor, and a second local interconnect coupled to the second requestor, the set of address lines, and the set of data lines. In this embodiment, the first memory encryption circuit is configured to encrypt write data corresponding to allowed access requests to the shared memory generated by only one of the first requestor and the second requestor prior to the TEE providing the write data for storage into the shared memory, and any write data corresponding to allowed access requests to the shared memory generated by another one of the first requestor and the second requestor is provided as unencrypted write data for storage into the shared memory. In one aspect, the first memory encryption circuit is further configured to decrypt read data from the shared memory corresponding to allowed access requests generated by the only one of the first requestor and the second requestor prior to the TEE returning the read data to the only one of the first request and the second requestor, wherein any read data corresponding to allowed access requests to the shared memory generated by the another one of the first requestor and the second requestor is returned to the another one of the first requestor and the second requestor as plain read data without any encryption nor decryption. In another aspect, the access requests to the shared memory comprises write access requests and read access requests. In a further aspect, the access requests include a corresponding access address and corresponding control information, wherein the access controller is configured to allow or deny access requests to the shared memory based on the corresponding control information. In yet a further aspect, the corresponding control information includes a secure identifier which identifies which requestor within the data processing system generated a received access request. In another aspect of the above embodiment, the first memory encryption circuit is configured to encrypt write data corresponding to allowed access requests to the shared memory generated by the first requestor prior to the TEE providing the write data for storage into the shared memory, wherein any write data corresponding to allowed access requests to the shared memory generated by the second requestor is provided as unencrypted write data for storage into the shared memory. In yet another aspect, the first memory encryption circuit is configured to encrypt write data corresponding to allowed access requests to the shared memory generated by the second requestor prior to the TEE providing the write data for storage into the shared memory, wherein any write data corresponding to allowed access requests to the shared memory generated by the first requestor is provided as unencrypted write data for storage into the shared memory. In a further aspect, the TEE further includes a second memory encryption circuit, and the data processing system further includes a second NEE configured to communicate with the TEE via a second set of address lines and a second set of data lines, wherein the second memory encryption circuit is configured to encrypt write data corresponding to allowed access requests to the shared memory generated by a requestor of the second NEE, prior to the TEE providing the write data for storage into the shared memory. In another further aspect, the TEE further includes a set of memory encryption circuits, and the data processing system further includes a plurality of NEEs, including the NEE, each configured to communicate with the TEE via a corresponding set of address lines and a corresponding set of data lines, wherein each memory encryption circuit of the set of memory encryption circuits is configured to encrypt received write data corresponding to allowed access requests to the shared memory generated by a requestor within a corresponding NEE of the plurality of NEEs, prior to the TEE providing the received write data for storage into the shared memory. In yet a further aspect, each memory encryption circuit of the set of memory encryption circuits is configured to encrypt received write data corresponding to allowed access requests to the shared memory generated by requestors within multiple corresponding NEEs of the plurality of NEEs. In yet another aspect of the above embodiment, the data processing system is further characterized as a system-on-chip (SoC).

Another embodiment includes a method in a data processing system, in which the data processing system includes a trusted execution environment (TEE), a normal execution environment (NEE), and a shared memory external to the TEE, wherein the TEE includes a memory encryption circuit corresponding to only one of the TEE and the NEE. The method includes receiving, by an access controller within the TEE configured to control access to the shared memory, a write access request generated by a requestor located within the TEE or the NEE; and in response to the access controller allowing the requested write access to the shared memory, providing corresponding write data to the shared memory, wherein, if the requestor is located in the only one of the TEE and the NEE, encrypting the write data by the memory encryption circuit prior to providing the write data to the shared memory, otherwise, providing the write data as unencrypted plain data to the shared memory. In one aspect of the another embodiment, only write data from the only one of the TEE and the NEE is encrypted prior to storage into the shared memory, while write data from another one of the TEE and the NEE is only stored as unencrypted plain data in the shared memory. In another embodiment, the method further includes receiving, by the access controller, a read access request generated by a second requestor located within the TEE or the NEE; in response to the access controller allowing the requested read access to the shared memory, the TEE receiving read data from the shared memory; and if the second requestor is located in the only one of the TEE and the NEE, decrypting the read data by the memory encryption circuit prior to returning the decrypted read data back to the second requestor, otherwise, returning the read data as plain read data without decryption back to the second requestor. In yet another embodiment, the only one of the TEE and the NEE corresponds to the NEE, and the data processing system includes a plurality of NEEs, including the NEE, and the TEE includes a plurality of memory encryption circuits, including the memory encryption circuit, and the method further includes receiving, by the access controller, write access requests from requestors, each requestor located in one of the plurality of NEEs or in the TEE; when the access controller allows a first write access request generated by a first requestor, selectively encrypting write data corresponding to the first write access request, wherein the selectively encrypting includes encrypting the write data corresponding to the first write access request when the first requestor is located in one of the plurality of NEEs by a corresponding memory encryption circuit of the plurality of memory encryption circuits but not encrypting the write data corresponding to the first write access request when the first requestor is located within the TEE; and storing the selectively encrypted write data corresponding to the first write access request into the shared memory at a first access address corresponding to the first write access request. In a further aspect, the method further includes receiving, by the access controller, read access requests from the requestors; in response to the access controller allowing a first read access request generated by a second requestor, receiving read data corresponding to the first read access request; selectively decrypting read data corresponding to the first read access request, wherein the selectively decrypting includes decrypting the read data corresponding to the first read access request when the second requestor is located in one of the plurality of NEEs by a second corresponding memory encryption circuit of the plurality of memory encryption circuits but not decrypting the read data corresponding to the first read access request when the second requestor is located within the TEE; and returning the selectively decrypted read data corresponding to the first read access request to the second requestor.

In yet another embodiment, a data processing system includes a shared memory; a trusted execution environment (TEE) including a first requestor, a first local interconnect, an access controller, and a set of memory encryption circuits, the first requestor and the access controller coupled to the first local interconnect, and the access controller configured to allow or deny access requests to the shared memory, wherein the shared memory is external to the TEE; and a set of normal execution environments (NEEs), each configured to communicate with the TEE via a corresponding set of address lines and a corresponding set of data lines. In this yet another embodiment, a corresponding memory encryption circuit of the set of memory encryption circuits is configured to encrypt write data corresponding to allowed access requests to the shared memory generated by any requestor in the set of NEEs prior to the TEE providing the write data for storage into the shared memory, and any write data corresponding to allowed access requests to the shared memory generated by the first requestor is provided as plain write data, without any encryption nor decryption, for storage into the shared memory. In one aspect, each memory encryption circuit of the set of encryption circuits in the TEE corresponds to one or more requestors in the set of NEEs, each memory encryption circuit utilizing a different key. In another aspect, the corresponding memory encryption circuit of the set of memory encryption circuits is configured to decrypt read data corresponding to allowed access requests to the shared memory generated by any requestor in the set of NEEs prior to the TEE returning the read data to any NEE of the set of NEEs, wherein any read data corresponding to allowed access requests to the shared memory generated by the first requestor is returned from the shared memory to the first requestor without any encryption nor decryption. In yet another aspect, the data processing system is further characterized as a system-on-chip (SoC).

What is claimed is:

1. A data processing system comprising:
    a shared memory;
    a trusted execution environment (TEE) including a first requestor, a first local interconnect, an access controller, and a first memory encryption circuit, the first requestor and the access controller coupled to the first local interconnect, and the access controller configured to allow or deny access requests to the shared memory, wherein the shared memory is external to the TEE; and
    a normal execution environment (NEE) configured to communicate with the TEE via a set of address lines and a set of data lines, the NEE including a second requestor, and a second local interconnect coupled to the second requestor, the set of address lines, and the set of data lines,
    wherein the first memory encryption circuit is configured to encrypt write data corresponding to allowed access requests to the shared memory generated by only one of the first requestor and the second requestor prior to the TEE providing the write data for storage into the shared memory, wherein any write data corresponding to allowed access requests to the shared memory generated by another one of the first requestor and the second requestor is provided as unencrypted write data for storage into the shared memory.

2. The data processing system of claim 1, wherein the first memory encryption circuit is further configured to decrypt read data from the shared memory corresponding to allowed access requests generated by the only one of the first requestor and the second requestor prior to the TEE returning the read data to the only one of the first request and the second requestor, wherein any read data corresponding to allowed access requests to the shared memory generated by the another one of the first requestor and the second requestor is returned to the another one of the first requestor and the second requestor as plain read data without any encryption nor decryption.

3. The data processing system of claim 1, wherein the access requests to the shared memory comprises write access requests and read access requests.

4. The data processing system of claim 3, wherein the access requests comprises a corresponding access address and corresponding control information, wherein the access controller is configured to allow or deny access requests to the shared memory based on the corresponding control information.

5. The data processing system of claim 4, wherein the corresponding control information includes a secure identifier which identifies which requestor within the data processing system generated a received access request.

6. The data processing system of claim 1, wherein the first memory encryption circuit is configured to encrypt write data corresponding to allowed access requests to the shared memory generated by the first requestor prior to the TEE providing the write data for storage into the shared memory, wherein any write data corresponding to allowed access requests to the shared memory generated by the second requestor is provided as unencrypted write data for storage into the shared memory.

7. The data processing system of claim 1, wherein the first memory encryption circuit is configured to encrypt write data corresponding to allowed access requests to the shared memory generated by the second requestor prior to the TEE providing the write data for storage into the shared memory, wherein any write data corresponding to allowed access requests to the shared memory generated by the first requestor is provided as unencrypted write data for storage into the shared memory.

8. The data processing system of claim 7, wherein the TEE further includes a second memory encryption circuit, the data processing system further comprising:
a second NEE configured to communicate with the TEE via a second set of address lines and a second set of data lines, wherein the second memory encryption circuit is configured to encrypt write data corresponding to allowed access requests to the shared memory generated by a requestor of the second NEE, prior to the TEE providing the write data for storage into the shared memory.

9. The data processing system of claim 7, wherein the TEE further includes a set of memory encryption circuits, the data processing system further comprising:
a plurality of NEEs, including the NEE, each configured to communicate with the TEE via a corresponding set of address lines and a corresponding set of data lines, wherein each memory encryption circuit of the set of memory encryption circuits is configured to encrypt received write data corresponding to allowed access requests to the shared memory generated by a requestor within a corresponding NEE of the plurality of NEEs, prior to the TEE providing the received write data for storage into the shared memory.

10. The data processing system of claim 9, wherein each memory encryption circuit of the set of memory encryption circuits is configured to encrypt received write data corresponding to allowed access requests to the shared memory generated by requestors within multiple corresponding NEEs of the plurality of NEEs.

11. The data processing system of claim 1, wherein the data processing system is further characterized as a system-on-chip (SoC).

12. In a data processing system comprising a trusted execution environment (TEE), a normal execution environment (NEE), and a shared memory external to the TEE, wherein the TEE includes a memory encryption circuit corresponding to only one of the TEE and the NEE, a method comprising:
receiving, by an access controller within the TEE configured to control access to the shared memory, a write access request generated by a requestor located within the TEE or the NEE; and
in response to the access controller allowing the requested write access to the shared memory, providing corresponding write data to the shared memory, wherein:
if the requestor is located in the only one of the TEE and the NEE, encrypting the write data by the memory encryption circuit prior to providing the write data to the shared memory,
otherwise, providing the write data as unencrypted plain data to the shared memory,
wherein only write data from the only one of the TEE and the NEE is encrypted prior to storage into the shared memory, while write data from another one of the TEE and the NEE is only stored as unencrypted plain data in the shared memory.

13. The method of claim 12, further comprising:
receiving, by the access controller, a read access request generated by a second requestor located within the TEE or the NEE;
in response to the access controller allowing the requested read access to the shared memory, the TEE receiving read data from the shared memory; and
if the second requestor is located in the only one of the TEE and the NEE, decrypting the read data by the memory encryption circuit prior to returning the decrypted read data back to the second requestor, otherwise, returning the read data as plain read data without decryption back to the second requestor.

14. The method of claim 12, wherein the only one of the TEE and the NEE corresponds to the NEE, the data processing system includes a plurality of NEEs, including the NEE, and the TEE includes a plurality of memory encryption circuits, including the memory encryption circuit, the method further comprising:
receiving, by the access controller, write access requests from requestors, each requestor located in one of the plurality of NEEs or in the TEE;
when the access controller allows a first write access request generated by a first requestor, selectively encrypting write data corresponding to the first write access request, wherein the selectively encrypting comprises:
encrypting the write data corresponding to the first write access request when the first requestor is located in one of the plurality of NEEs by a corresponding memory encryption circuit of the plurality of memory encryption circuits but not encrypting the write data corresponding to the first write access request when the first requestor is located within the TEE; and storing the selectively encrypted write data corresponding to the first write access request into the shared memory at a first access address corresponding to the first write access request.

15. The method of claim 14, further comprising:

receiving, by the access controller, read access requests from the requestors;

in response to the access controller allowing a first read access request generated by a second requestor, receiving read data corresponding to the first read access request;

selectively decrypting read data corresponding to the first read access request, wherein the selectively decrypting comprises:

decrypting the read data corresponding to the first read access request when the second requestor is located in one of the plurality of NEEs by a second corresponding memory encryption circuit of the plurality of memory encryption circuits but not decrypting the read data corresponding to the first read access request when the second requestor is located within the TEE; and returning the selectively decrypted read data corresponding to the first read access request to the second requestor.

16. A data processing system comprising:

a shared memory;

a trusted execution environment (TEE) including a first requestor, a first local interconnect, an access controller, and a set of memory encryption circuits, the first requestor and the access controller coupled to the first local interconnect, and the access controller configured to allow or deny access requests to the shared memory, wherein the shared memory is external to the TEE; and a set of normal execution environments (NEEs), each configured to communicate with the TEE via a corresponding set of address lines and a corresponding set of data lines, wherein a corresponding memory encryption circuit of the set of memory encryption circuits is configured to encrypt write data corresponding to allowed access requests to the shared memory generated by any requestor in the set of NEEs prior to the TEE providing the write data for storage into the shared memory, wherein any write data corresponding to allowed access requests to the shared memory generated by the first requestor is provided as plain write data, without any encryption nor decryption, for storage into the shared memory.

17. The data processing system of claim 16, wherein each memory encryption circuit of the set of encryption circuits in the TEE corresponds to one or more requestors in the set of NEEs, each memory encryption circuit utilizing a different key.

18. The data processing system of claim 16, wherein the corresponding memory encryption circuit of the set of memory encryption circuits is configured to decrypt read data corresponding to allowed access requests to the shared memory generated by any requestor in the set of NEEs prior to the TEE returning the read data to any NEE of the set of NEEs, wherein any read data corresponding to allowed access requests to the shared memory generated by the first requestor is returned from the shared memory to the first requestor without any encryption nor decryption.

19. The data processing system of claim 16, wherein the data processing system is further characterized as a system-on-chip (SoC).

* * * * *